Jan. 7, 1930.                 H. F. McNALLY                 1,742,964
                              MILK STRAINER
                            Filed Aug. 14, 1928
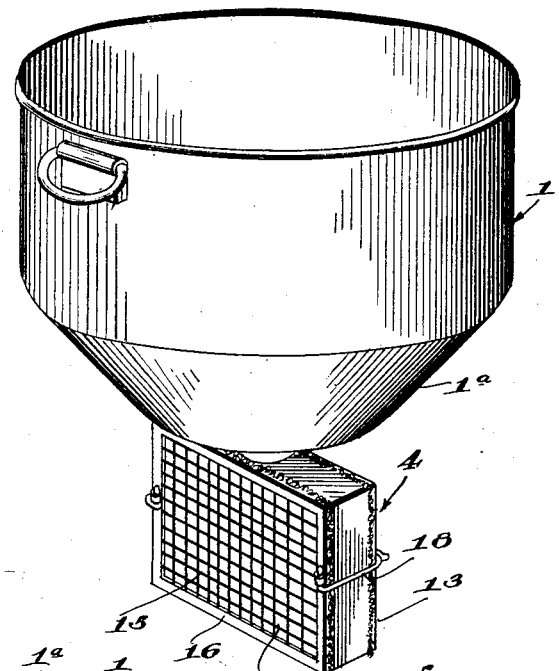
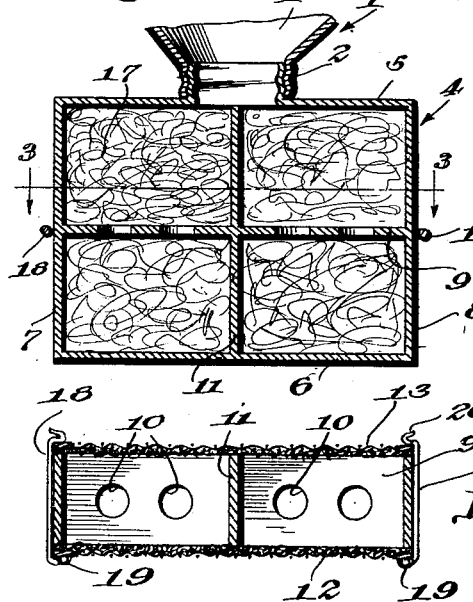
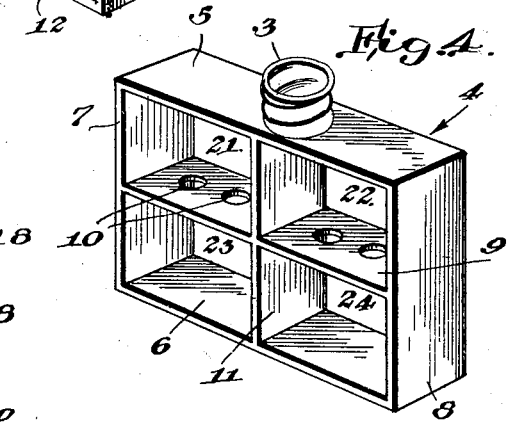
WITNESSES
C. B. Shillinger
INVENTOR
H. F. McNally
BY
ATTORNEY Patented Jan. 7, 1930

1,742,964

UNITED STATES PATENT OFFICE

HUGH FRANCIS McNALLY, OF RICHLAND CENTER, WISCONSIN

MILK STRAINER

Application filed August 14, 1928. Serial No. 299,621.

This invention relates to strainers and more particularly to milk strainers.

A primary object of the invention is to provide a strainer of this character so constructed that the filtering or straining elements will be so disposed that the liquid being strained will impinge against the sides of the strainer preventing clogging of the filtering element and the forcing therethrough of the material desired to be strained out.

Another object is to so construct a strainer of this character that the parts thereof may be readily taken apart for cleaning and other purposes.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 is a perspective view of a strainer constructed in accordance with this invention;

Fig. 2 is a vertical section of the straining element shown connected with the lower portion of the receiving bowl, the latter being broken off;

Fig. 3 is a longitudinal section taken on the line 3—3 of Fig. 2; and

Fig. 4 is a perspective view of the frame which holds the filtering element.

In the embodiment illustrated a receiving pan or bowl 1 is shown having a funnel-shaped bottom 1ª terminating in a threaded neck which is open at its lower end and designed to detachably engage a threaded neck 3 carried by the frame 4 which holds the straining or filtering element.

The strainer frame 4 is here shown rectangular in form comprising a top 5, bottom 6 and end members 7 and 8, all made of imperforate material and divided into compartments by horizontal partitions 9 having apertures 10 formed therein and a vertical partition 11.

The sides of the frame 4 are composed of coarse wire mesh or other suitable foraminous material and here numbered 12 and 13. This material is surrounded by a rigid frame 16 preferably of metal and said frame is hingedly connected at one end to one end of the frame 4 and operates to hold in position the filtering element 17 which may be of cotton padding or other suitable straining material. These side members are held in closed position by means of snap fasteners 18 hinged at one end as shown at 19 in Fig. 3 and having a hook 20 which snaps over the opposite side of the strainer.

If desired the fastening element 18 may be detachably connected with the side members to be secured so that all parts may be separated for cleaning and other purposes.

In the use of this strainer the receiving bowl 1 is connected with the frame 4 by screwing the neck 2 thereof onto the neck 3 of the frame as shown clearly in Fig. 2 and the device is placed in any suitable vessel into which the milk or other liquid is to be strained. On the pouring of the liquid into the bowl 1 it passes down into the compartments 21 and 22 located at the top of the frame, the neck 3 being arranged so that the partition 11 will be arranged centrally in regard to the neck as is shown clearly in Fig. 2. After the liquid passes into the compartments 21 and 22 the heavier particles or sediments may lodge on the partition 9 while the liquid will pass through the apertures 10 into the compartments 23 and 24 below and the majority of the sediment will be deposited on the bottom 6. It is of course understood that the liquid passes out through the foraminous sides of the strainer into the vessel into which it is to be deposited.

It will be obvious that this arrangement of the straining element allows the heavy sediment to fall onto the bottom of the strainer and prevents it lodging on the filtering pads 17 and thereby will prolong the life of these pads keeping them clean longer.

While this strainer 4 is here shown rectangular obviously it may be of any other desired shape and it is not desired that the frame be limited to the form shown.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

A filtering element for a strainer comprising a frame having imperforate ends, bottom and top partitions arranged therein to divide it into a plurality of compartments, the upper and lower of which communicate, a threaded neck carried by the top of said frame for connection with a container, foraminous side members hinged to the frame to swing outwardly, and filtering pads disposed between said side members and the partitions within the frame.

HUGH FRANCIS McNALLY.